Figure 1:
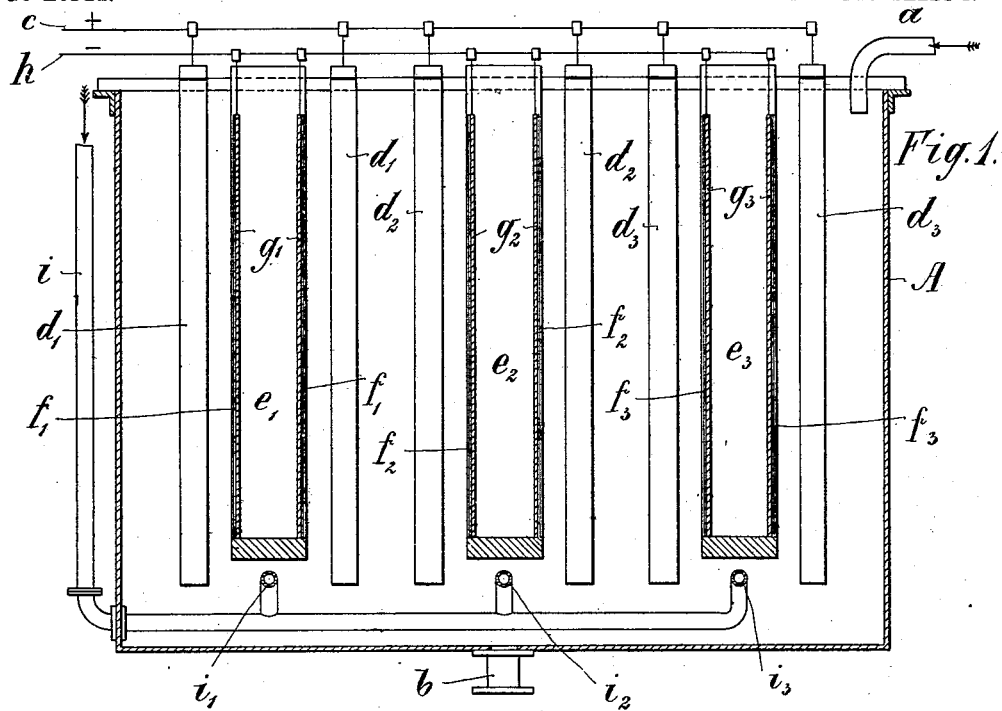

No. 751,179. PATENTED FEB. 2, 1904.
A. KOLLREPP & A. WOHL.
PROCESS OF ELECTROLYTICALLY PURIFYING JUICES.
APPLICATION FILED JUNE 10, 1902.
NO MODEL. 2 SHEETS—SHEET 1.

WITNESSES:
Frank E. Boyce
Fred Holman

INVENTORS
Alexander Kollrepp
Alfred Wohl
BY Goepel & Niles,
ATTORNEYS.

No. 751,179. PATENTED FEB. 2, 1904.
A. KOLLREPP & A. WOHL.
PROCESS OF ELECTROLYTICALLY PURIFYING JUICES.
APPLICATION FILED JUNE 10, 1902.
NO MODEL. 2 SHEETS—SHEET 2.
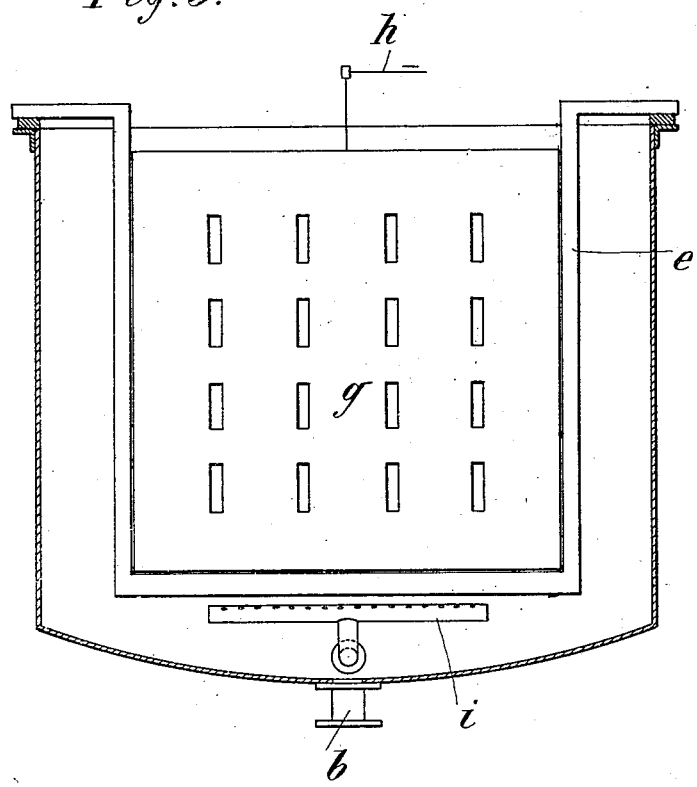

No. 751,179. Patented February 2, 1904.

UNITED STATES PATENT OFFICE.

ALEXANDER KOLLREPP, OF BERLIN, AND ALFRED WOHL, OF CHARLOTTENBURG, GERMANY.

PROCESS OF ELECTROLYTICALLY PURIFYING JUICES.

SPECIFICATION forming part of Letters Patent No. 751,179, dated February 2, 1904.

Application filed June 10, 1902. Serial No. 110,994. (No specimens.)

*To all whom it may concern:*

Be it known that we, ALEXANDER KOLLREPP, a resident of 137 Wilhelmstrasse, Berlin, and ALFRED WOHL, a resident of 49 Bleibtreustrasse, Charlottenburg, Germany, citizens of the German Empire, have invented a certain new and useful Improved Process of Electrolytically Purifying Juices, of which the following is a full and clear specification.

The invention has for its object to obtain an easier purification of such juices than heretofore.

The hitherto known processes of electrolytically purifying juices for the purpose of extracting through diaphragms by electrolysis from the juices the alkalies as well as the acids cannot be put into practical use on account of the great resistances occurring. If the alkali only is extracted by electrodialysis, or by amalgamation on the negative electrode of mercury, the amount of current consumed is more favorable, but naturally the liberated acids remain in the juice if positive electrodes are employed that cannot be attacked. This result is not changed by a mere mechanical arrangement of the electrodes. A purification tested by increasing the quotient has hitherto been only obtained by employing positive electrodes of soluble metals—for instance, lead or zinc—the liberated acids thereby largely separating as insoluble metal salts. Great difficulties are, however, met with in the practical carrying out of the process of the electrolysis by means of positive electrodes of soluble metals. The retransformation of the obtained deposit into the metal has hitherto neither been described or possible without extensive plant and great loss, and not only is the regeneration of the material, but also the renovation of the mold is exceedingly expensive, as an economical consumption of current is only obtainable with very large continually renewed electrode-surface. Finally polarization takes place in consequence of metal deposits from the material of the electrode itself, in view of the fact that the deposit partially rigidly adheres to the electrode and hereby stops the flow of the current and the further dissolution of the metal. An effective obviation of these drawbacks has hitherto not been obtained by purely mechanical means and is exceedingly difficult on account of the extent of the surface here in question and of the short distances between the separate electrodes, this distance being chosen as required by the consumption of current.

The improved process forming the subject of this invention consists in electrolytically treating sacchariferous solutions of any kind, as juices of beet-root, sugar-cane, or refinery juices, for the purpose of obtaining a complete purification and to obviate all the above-mentioned drawbacks connected with the hitherto known processes in which rapidly soluble electrodes are employed.

The improved process consists in the separation of the alkali by electrodialysis, or by amalgamation on the negative electrode of mercury and in the binding of the liberated acids on the positive electrode by basic compounds of lead oxid or zinc oxid or hydroxids of these metals, which are easily attacked by the current and are suspended in the juice, preferably by saccharate of lead. For this process indifferent positive electrodes can be employed which can neither be attacked nor rendered ineffective by rigidly-adhering deposits, but can have any area of surface desired, as they need no renewal. The non-sacchariferous substances are precipitated as insoluble metal compounds. From these deposits the non-sacchariferous substances can be again extracted by the electrolytically-liberated alkali, and thus the basic compounds of the metal hydroxid necessary for the purification of the juice are regenerated by the wet process. A like result can be also obtained by burning the deposits in question. The employment of saccharate of lead has especially given good results in the production of a very high purification, the ready capability of regeneration, and the additional gain of sugar from the saccharate of lead. Experiments have shown that the compounds of lead of the non-sacchariferous substances obtained in purifying juices in this manner are transformed to saccharate of lead upon mixing them with the discharged sacchariferous liquid and excessive alkali, the saccharate of lead being separated from the lye by filter-presses. The filtered cakes are not completely washed out, as a quantity of alkali not greater than one per cent. plays no part and is easily extracted during the electrolytical process. The saccharate of lead uniting with the non-sacchariferous substances during the process of electrolysis, the sugar obtained from the discharged liquid is liberated and dissolved, so that in a continuous process the whole amount of juices is obtained in a crystallized form. The deposits obtained by the electrolytical purification need not even be carefully freed of sugar, as the latter is not lost, but is found again in the next following formation of saccharate. It suffices, therefore, in all cases to press off the deposits containing lead about twice only without washing, and that simplifies considerably the practical execution of this process on a large scale. Known processes of producing saccharate of lead by means of alkali employ, without exception, for this purpose oxid of lead or carbonate of lead. It has hitherto not been known that the acidic organic deposits which are precipitated during the electrolytical purification of the juice can likewise be employed.

Figure 2:
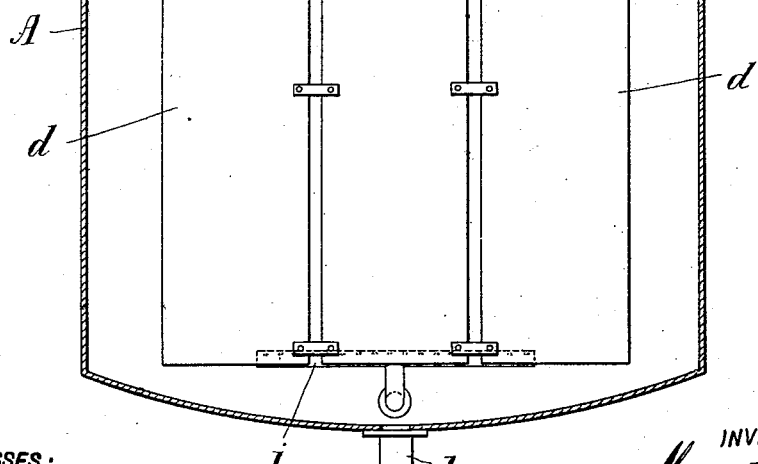

In the accompanying drawings, Figure 1 is a vertical longitudinal section of an apparatus for carrying out our improved process. Fig. 2 is a vertical transverse section through the apparatus, showing the carbon electrodes; and Fig. 3 is a vertical transverse section through the apparatus, showing the iron electrodes.

Similar letters of reference indicate corresponding parts.

The tank A serves as a vessel for containing the electrolyte. The tank is preferably rectangular in horizontal section. It is provided with an upper supply-channel $a$ and a lower discharge-channel $b$ for the juice previously treated with lead saccharate. Above the tank $a$, insulated from the same, is secured a metal plate $c$, to which the positive carbon electrodes $d'$ $d^2$, &c., are conductively fastened. These electrodes are formed as plates of suitable size and are placed closely together, nevertheless with sufficient passage between them so as to permit the ready circulation of the fluid. Two carbon electrodes of similar sign and the intermediate diaphram-cell $e$ work together in such manner that only the two sides of the two carbon plates which face each other act as electrode-surfaces. The distance between the inner surfaces of these carbon plates and the surface of the diaphragm is made as small as is compatible with uniform mixing of the fluid. The distance of the exterior surfaces of the carbon plates from each other—for example, $d'$ from $d^2$—may be arranged as may be desired. By this means the proportion of the electrolytic fluid to the electrode-surface, and thereby the duration of time for the electrolysis of a single charge varied.

The diaphragm-cells $e'$ $e^2$, &c., have side walls of non-conducting material upon which are stretched the parchment paper sheets $f'$ $f'$ $f^2$ $f^2$. At the inside of each parchment sheet is arranged a sieve-like perforated iron plate $g'$ $g'$ $g^2$ $g^2$, which acts as a negative electrode. These electrodes are all conductively connected with the conducting-bar $h$. Beneath the diaphragm-cells the air-inlet pipes $i'$ $i^2$ terminate. The carbon plates extend slightly deeper than the diaphragm-cells so as to effect the rising of the air in the mixture, chiefly between the carbon plates and the parchment-surfaces. The emptying and filling of the diaphragm-cells is accomplished by means of siphon-tubes introduced from above.

First example: The juice of beet-root obtained by diffusion is precipitated with approximately 0.3 per cent. of lime and carbonic acid or with weak acid, producing a deposit and passed through the press after the addition of carbonate of lime or other filtration means. This preliminary filtration has the purpose of avoiding the accumulation of deposits insoluble in alkali in the lead substance subsequently employed. The clear juice is then mixed with eight to ten per cent. of its own weight of moist saccharate of lead (containing fifty per cent. of water) and subjected to electrolysis during intensive stirring, effected, for instance, by blowing in air at about 60° Celsius. Positive electrodes of natural or artificial electrode carbon have given good results, the negative electrodes being of iron plates, the diaphragm of parchment paper. At a distance of about three centimeters of the electrodes and eight to ten volts tension the intensity of current is prodecimeter at the beginning, one and one-half amperes, the same sinks naturally in the same degree, as the alkali is extracted by electrodialysis and is on the average approximately one ampere. The purification is finished when a sample of the filtrated juice produces no deposit with a drop of subacetate of lead. The amount of potassic hydrate diffusing to the negative electrode is about one per cent. of the weight of sugar purified by electrolysis. The alkali solution need not be renewed for each electrolysis, but may be made richer in alkali by repeated use. At an average amperage of one ampere pro square decimeter one-fourth square meter surface of electrodes and ten horse-power hours are consumed for a cubic meter juice in a day. The filtrated juice is bright, the visible quotient of purity higher than ninety-six. Inverted sugar is not found. The slight amount of lead in the juice, under one-tenth per cent. is extracted in known manner by lime and carbonic acid and the juice further treated in the usual manner. The moist deposit of compounds of lead of the non-sacchariferous substances (having about thirty per cent. of water) is mixed with about one-fifth of its weight of sugar in the form of the juice of the first or second product, and with two to three times of its weight of an aqueous solution of alkali of about eight and one-half per cent. KOH, (one and one-half normal weight) at about 50° to 55° Celsius. The lye without sugar now contains the other substances bound to lead during the electrolytical purification. This lye is saturated in the well-known manner with carbonic acid to extract dissolved lead, then vaporized, burned, and regenerated by treating the obtained potassic ashes with lime. The losses are more than covered by the alkali electrolytically obtained.

Second example: Treacle syrup of three to four per cent. ash of sugar is diluted to 30° to 40° Brix, filtered, and then mixed with forty to fifty per cent. of the weight of sugar of wet saccharate of lead. The electrolysis is effected at 40° to 50° Celsius and otherwise under the same conditions as in the first example, thus three hundred kilograms of sugar being purified in this manner in a day pro square meter of the electrode-surface. The greater part of alkali and about the half of the non-racchariferous organic substances are extracted, the further treatment taking place as in the first example. Preferably the filtered juice can be electrolyzed before or after the proper electrolysis with saccharate of lead by altering the direction of the electric current, so that the carbon electrodes dipping in the juice become negative in such cases, for the positive electrodes dipping in the water carbon electrodes must likewise be chosen. In this manner a great part of the acids which cannot be precipitated by acetate of lead is electrolytically extracted from the juice. If the electrolysis is carried out with a reversed direction of the current in the first place, the alkali is liberated in the juice, which is subsequently electrodialytically extracted. If the electrolysis is carried out with a reversed direction of current in the second place, lime is freed, which is precipitated with carbonic acid.

Having now particularly described and ascertained the nature of our said invention and in what manner the same is to be performed, what we claim is—

1. An improved process for purifying sacchariferous solutions, consisting in the electrolysis of these solutions under addition to the same of saccharate of lead, as set forth.

2. An improved process for purifying sacchariferous solutions, consisting in the electrolysis of these solutions under addition to the same of saccharate of lead, the transformation of the deposits obtained by this process of lead by means of alkali and sacchariferous solutions, in order to again employ the same in this process.

In witness whereof we have hereunto set our hands in presence of two witnesses.

ALEXANDER KOLLREPP.
ALFRED WOHL.

Witnesses:
HENRY HASPER,
WOLDEMAR HAUPT.